United States Patent
Summers

(10) Patent No.: US 8,011,707 B1
(45) Date of Patent: Sep. 6, 2011

(54) COUPLING ASSEMBLY FOR TRANSPORTING WHEELED CHAIRS AND ASSOCIATED METHOD

(76) Inventor: Carlton Summers, Gary, IN (US)

(*) Notice: Subject to any disclaimer, the term of this patent is extended or adjusted under 35 U.S.C. 154(b) by 486 days.

(21) Appl. No.: 12/221,661

(22) Filed: Aug. 5, 2008

Related U.S. Application Data

(60) Provisional application No. 60/963,392, filed on Aug. 6, 2007.

(51) Int. Cl.
*B62B 5/06* (2006.01)
*B65G 7/00* (2006.01)

(52) U.S. Cl. ........ 294/15; 294/175; 280/47.35; 297/248

(58) Field of Classification Search ............. 294/1.1, 294/15, 19.1; 297/248; 280/47.19, 47.35
See application file for complete search history.

(56) References Cited

U.S. PATENT DOCUMENTS

| | | | |
|---|---|---|---|
| 712,898 A * | 11/1902 | Barney | 297/248 |
| 3,132,886 A * | 5/1964 | Meeks | 294/16 |
| 3,942,813 A | 3/1976 | Dombroski | |
| 4,081,199 A | 3/1978 | Blodee | |
| 4,225,104 A * | 9/1980 | Larson | 248/125.8 |
| 4,659,124 A * | 4/1987 | Hillman | 294/19.1 |
| 4,805,938 A * | 2/1989 | Redmond et al. | 280/47.35 |
| 4,807,916 A * | 2/1989 | Erickson | 294/15 |
| 5,002,337 A | 3/1991 | Engel | |
| 5,217,240 A * | 6/1993 | Gardenhour et al. | 280/282 |
| 5,351,365 A * | 10/1994 | Hauck | 16/422 |
| 5,522,121 A * | 6/1996 | Fraynd et al. | 24/335 |
| 5,529,427 A * | 6/1996 | Bost | 403/391 |
| 7,464,974 B2 * | 12/2008 | Oktay | 294/19.1 |
| 7,597,332 B2 * | 10/2009 | Thompson | 280/47.38 |

* cited by examiner

*Primary Examiner* — Dean Kramer

(57) ABSTRACT

A manually-operable coupling assembly may include a primary coupling and auxiliary couplings. Both the primary and auxiliary couplings preferably include an elongated strap with a clamp attached to a distal end thereof. Each clamp may include a first and C-shaped region with a cavity and socket formed therein. A second C-shaped region may be pivotally mated to the first C-shaped region and may have a male finger with a ball bearing protruding outwardly from a distal tip thereof. The ball bearing may penetrate into the socket and become interlocked so that the first and second C-shaped regions may remain in a closed position. A spring-actuated stop block is calibrated to withstand varying pulling forces during transport as needed.

15 Claims, 6 Drawing Sheets

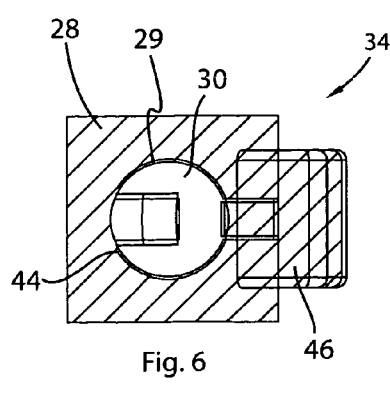
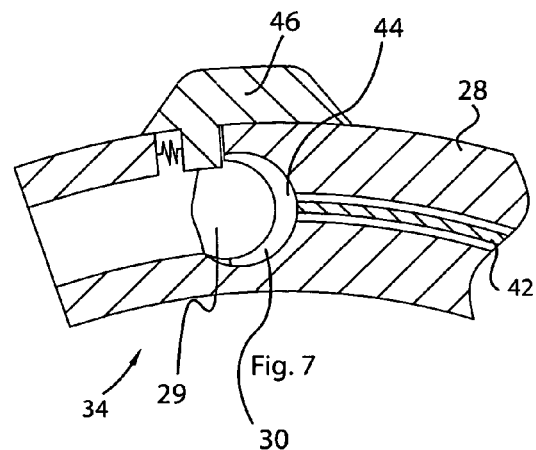
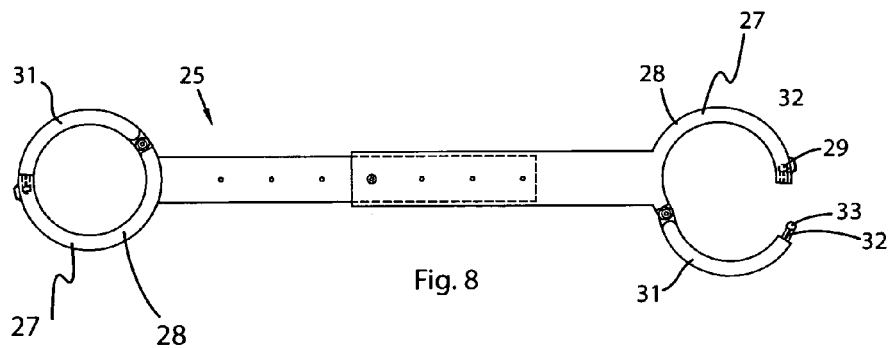
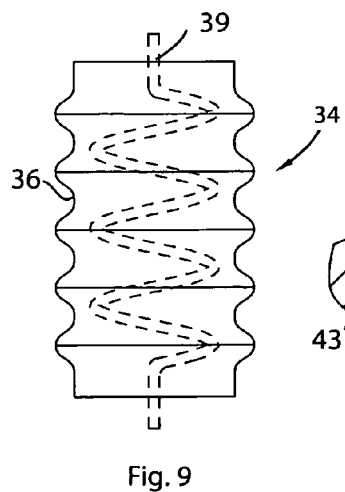
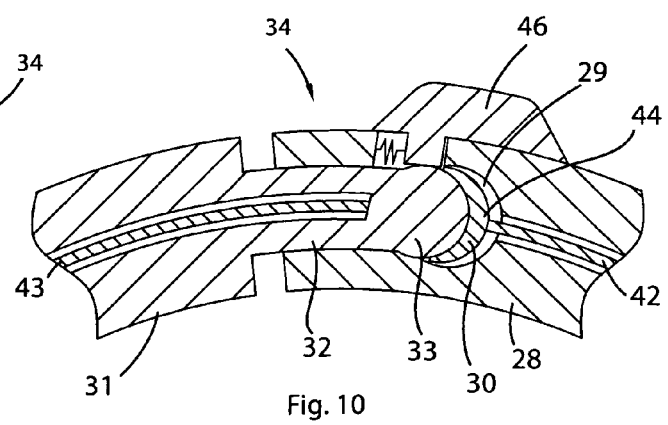

COUPLING ASSEMBLY FOR TRANSPORTING WHEELED CHAIRS AND ASSOCIATED METHOD

CROSS REFERENCE TO RELATED APPLICATIONS

This application claims the benefit of U.S. Provisional Application No. 60/963,392, filed Aug. 6, 2007, the entire disclosures of which are incorporated herein by reference.

STATEMENT REGARDING FEDERALLY SPONSORED RESEARCH OR DEVELOPMENT

Not Applicable.

REFERENCE TO A MICROFICHE APPENDIX

Not Applicable.

BACKGROUND OF THE INVENTION

1. Technical Field

This invention relates to transport assemblies and, more particularly, to a manually-operable coupling assembly for rolling a series of wheeled chairs along a ground surface.

2. Prior Art

Chairs are among the oldest useful articles of man and are consequently known in an almost unimaginable number of forms. These forms are oriented not only to the basic purpose of sitting or comfortable sitting but also to the possibility of production costs and among others to the possibility of providing the chair with other objects such as arm rests or wheels for making the chairs portable in nature. When it comes time to moving a large quantity of chairs it is not uncommon to stack conventional chairs one on top of another, thus forming stacks that can be dragged or transported with a dolly between remote locations. This, however, is not a possibility with wheeled office chairs since the wheel assemblies at the bottom of these chairs precludes them from being stacked in by the method described herein above. Thus, if a person desires to move a large number of these chairs, they are required to push, carry or pull them, one at a time between the remote locations.

U.S. Pat. No. 3,942,813 to Dombroski discloses a wheeled device for attachment to furniture legs. The device has a lifting surface in a channel which fits under a horizontal furniture leg crosspiece and which upon rotation of the wheels under the crosspiece elevates the furniture leg(s). Unfortunately, this prior art example fails to provide an assembly able to attach to and transport a series of wheeled chairs.

U.S. Pat. No. 4,081,199 to Blodee discloses a seating structure for a chair grouping includes a frame with a lower U-shaped front runner for each chair and a separate side frame member extending upwardly from the top of the runner at each side and rearwardly about the back cushion. For in-line chair arrangements, the side frame members extend downwardly at the center of the chair back and are connected to U-shaped rear runners of adjacent chairs. For zig-zag chair arrangements, the side frame members extend rearward of the chair back to provide for a row of oppositely facing chairs and thence downwardly where they are connected to U-shaped front runners of the opposed chairs which are staggered relative to the first chairs. The side frame members are interchangeable, as are the runners; and they are connected together by means of an H-shaped connector which also serves to connect the seat of the chairs to the frame. Unfortunately, this prior art example fails to provide a means of effectively transporting pieces of furniture.

U.S. Pat. No. 5,002,337 to Engel discloses stackable chair with a leg frame on which a seat and back are mounted. The leg frame comprises two lengths of flat tubing of dumb-bell shaped cross section bent to provide contiguous parallel portions which extend centrally transversely of the seat, portions extending from the ends of the parallel portions toward corner regions of the seat and portions bent downwardly to form the legs which are substantially in a vertical fore-and-aft plane but incline forwardly and rearwardly. When the chairs are stacked the legs of dumb-bell cross section nests with one another. The seat has a width substantially equal to the overall width of the leg frame and has cut-out corner regions to accommodate legs of superposed chairs when stacked. Plastic gliders at the bottom of the legs have support portions extending up along the legs for supporting superposed stacked chairs. The seat and back are mounted on the leg frame by two like supporting and connecting members at opposite sides of the chair, which also have provision for attaching an arm by a single screw or bolt or attaching a linking element for connecting chairs side by side in a row. The linking element is reversible so that it can be mounted with flat connecting lugs on the element directed either up or down. Unfortunately, this prior art examples fails to provide a means of transporting multiple pieces of wheeled office furniture.

Accordingly, a need remains for a manually-operable coupling assembly for wheeled office chairs and the like in order to overcome the above-noted shortcomings. The present invention satisfies such a need by providing an assembly that is convenient and easy to use, is durable yet lightweight in design, is versatile in its applications, and provides users with a quicker and more efficient means of rolling a series of wheeled chairs along a ground surface.

BRIEF SUMMARY OF THE INVENTION

In view of the foregoing background, it is therefore an object of the present invention to provide an assembly for rolling a series of wheeled chairs along a ground surface. These and other objects, features, and advantages of the invention are provided by a manually-operable coupling assembly.

A manually-operable coupling assembly for rolling a series of wheeled chairs along a ground surface may include a primary coupling preferably with a handle section and an elongated strap attached thereto. Such a primary coupling further may include a primary clamp attached to a distal end of the strap. The coupling assembly also may include a plurality of auxiliary couplings each preferably including a strap and a pair of axially opposed auxiliary clamps mated with the strap associated therewith respectively. In one embodiment, the straps of the auxiliary clamps may be telescopically adjusted along respective longitudinal lengths.

Such primary and auxiliary couplings are preferably adapted to be engaged to the series of wheeled chairs and thereafter configured in such a manner that the primary and auxiliary couplings lay at an end-to-end pattern during transport procedures.

Each of the primary and auxiliary clamps may also include a first C-shaped region rigidly mated to the strap and maintaining a fixed spatial relationship therewith. Such a first C-shaped region may include a cavity formed therein and further may have a socket slidably interfitted within the cavity.

Additionally, a second C-shaped region may be pivotally mated to the first C-shaped region and preferably is selectively biased along an arcuate path defined adjacent to a corresponding one of the straps. The second C-shaped region may have a male finger protruding outwardly from a distal tip thereof. The male finger preferably is provided with a ball bearing disposed at a distal end thereof and also may bend along a curvilinear path extending from a circumferential arc of the second C-shaped region.

During clamping procedures, the ball bearing may penetrate into the socket and become interlocked therewith when the male finger is introduced into the cavity. The first and second C-shaped regions may remain at the closed position when the ball bearing is interlocked with the socket and thereby bias the primary and auxiliary clamps to respective closed positions.

The primary coupling may further include a mechanism for automatically pivoting the primary clamp between the closed position and an open position by reciprocating a portion of the handle section along a linear path defined parallel to a longitudinal length of the strap of the primary coupling. In particular, the automatic primary clamp pivoting mechanism may include a lever attached to the handle section of the primary clamp and a plurality of collapsible sleeves preferably having axially opposed ends anchored to the lever and a distal end of the handle section respectively.

Additionally, such a mechanism may include a plurality of resilient spring members housed within the sleeves. Such spring members preferably are anchored to the lever and the distal end of the handle section such that the spring members compress and expand along mutually exclusive linear paths defined within the sleeves respectively.

Further, the mechanism may include a tensioned cable preferably having a proximal end statically connected directly to the lever. Such a tensioned cable preferably is distally directed along the longitudinal length of the strap and thereafter splits into first and second arcuate cable regions diverging along mutually exclusive arcuate paths. Such paths are defined within the first and second C-shaped regions of the primary clamp respectively. The first and second arcuate cable regions preferably have a corresponding distal end anchored to the socket and the male finger respectively. Each of the first and second arcuate cable portions preferably are simultaneously retracted and extended along the mutually exclusive arcuate paths when the lever is linearly displaced towards and away from the proximal end of the strap respectively.

During clamping procedures, the ball bearing is disengaged from the socket, thereby permitting the second C-shaped region to articulate away from the first C-shaped region. Additionally, the automatic primary clamp pivoting mechanism may include a stop block slidably connected to an outer surface of the first C-shaped region of the primary clamp. Thus, socket may be resiliently displaced towards and away from the stop block when the second arcuate cable portion is retracted and extended respectively.

In a preferred embodiment, the stop block may prohibit the socket from retracting beyond a maximum threshold as the spring members are expanded to elongated positions from equilibrium respectively. Thus, the auxiliary clamps remain at corresponding closed positions while the primary clamp is automatically biased between the open and closed positions respectively.

It is an additional intent of the present invention to provide a method for rolling a series of wheeled chairs along a ground surface. Such a method may include the first step of first providing a primary coupling including a handle section and an elongated strap attached thereto. The primary coupling further may include a primary clamp attached to a distal end of the strap. A second step of the method preferably includes providing a plurality of auxiliary couplings each including a strap and a pair of axially opposed auxiliary clamps mated with the strap associated therewith respectively.

In use, the method may further include the third step of engaging the auxiliary couplings to the series of wheeled chairs. Next, the method may include engaging the primary coupling to the series of wheeled chairs by automatically pivoting the primary clamp between open and closed positions by reciprocating a portion of the handle section along a linear path defined parallel to a longitudinal length of the strap of the primary coupling. Fifth, the method may include configuring the primary and auxiliary couplings in such a manner that the primary and auxiliary couplings lay at an end-to-end pattern during transport. Sixth, the method preferably includes transporting the series of wheeled chairs between remote locations. Finally, the method may entail disengaging the primary and auxiliary couplings from the series of wheeled chairs respectively.

There has thus been outlined, rather broadly, the more important features of the invention in order that the detailed description thereof that follows may be better understood, and in order that the present contribution to the art may be better appreciated. There are additional features of the invention that will be described hereinafter and which will form the subject matter of the claims appended hereto.

It is noted the purpose of the foregoing abstract is to enable the U.S. Patent and Trademark Office and the public generally, especially the scientists, engineers and practitioners in the art who are not familiar with patent or legal terms or phraseology, to determine quickly from a cursory inspection the nature and essence of the technical disclosure of the application. The abstract is neither intended to define the invention of the application, which is measured by the claims, nor is it intended to be limiting as to the scope of the invention in any way.

BRIEF DESCRIPTION OF THE SEVERAL VIEWS OF THE DRAWING

The novel features believed to be characteristic of this invention are set forth with particularity in the appended claims. The invention itself, however, both as to its organization and method of operation, together with further objects and advantages thereof, may best be understood by reference to the following description taken in connection with the accompanying drawings in which:

FIG. 6 is an enlarged cross-sectional view of a socket and cavity of the first C-shaped section, taken along line 6-6 in FIG. 3;

FIG. 7 is an enlarged cross-sectional view showing the interrelationship between the socket and the stop block inside the first C-shaped region, taken along line 7-7 in FIG. 3;

FIG. 8 is a reduced top plan view of the auxiliary clamp shown in FIG. 4;

FIG. 9 is an enlarged top plane view of a collapsible sleeve and associated spring member employed by the present invention; and FIG. 10 is an enlarged cross-sectional view showing the interrelationship between a ball bearing, the socket and the stop block inside the first C-shaped region when the primary clamp is adapted between open and closed positions.

DETAILED DESCRIPTION OF THE INVENTION

Figure 1:
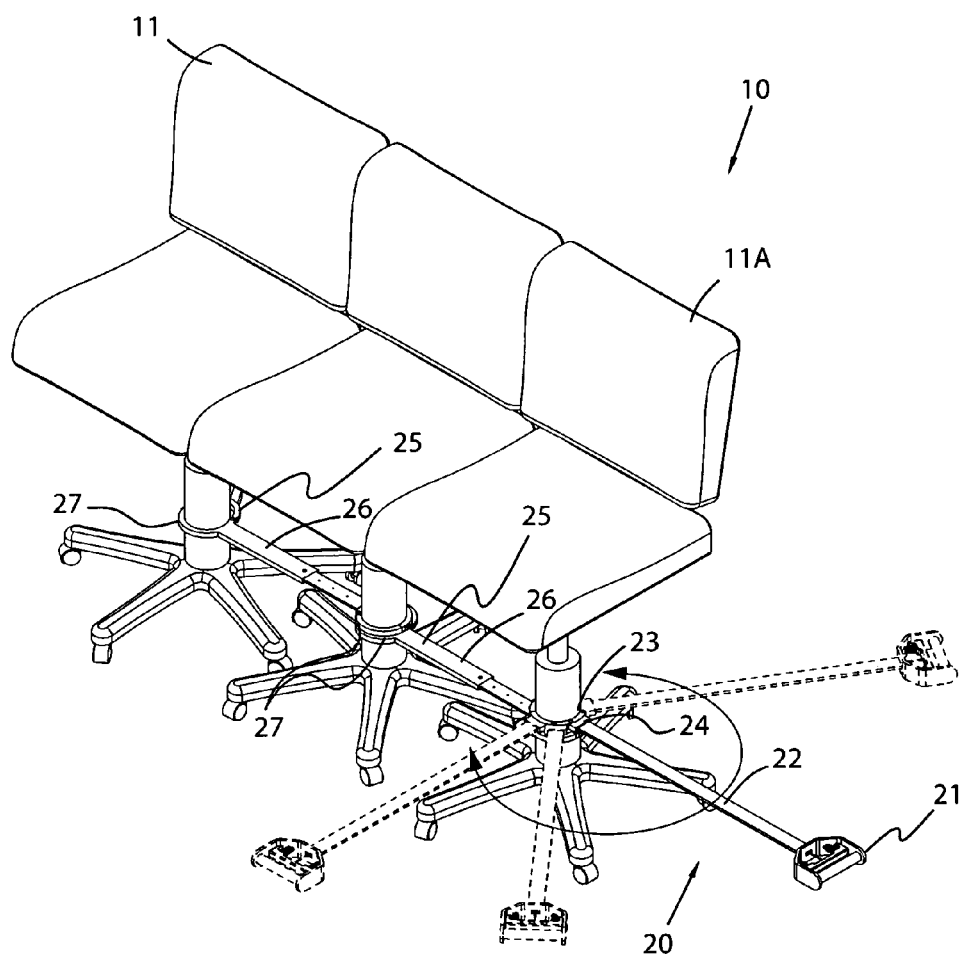
FIG. 1 is a perspective view showing a coupling assembly for transporting wheeled chairs, in accordance with the present invention.

The present invention will now be described more fully hereinafter with reference to the accompanying drawings, in which a preferred embodiment of the invention is shown. This invention may, however, be embodied in many different forms and should not be construed as limited to the embodiment set forth herein. Rather, this embodiment is provided so that this application will be thorough and complete, and will fully convey the true scope of the invention to those skilled in the art. Like numbers refer to like elements throughout the figures.

The assembly of this invention is referred to generally in FIGS. 1-10 by the reference numeral 10 and is intended to provide a manually-operable coupling assembly. It should be understood that the assembly 10 may be used for rolling a series of different sized and shaped wheeled chairs along a ground surface and should not be limited in use to the applications mentioned herein. For example, a user may connect wheeled chairs with differently sized wheel bases for transport.

Figure 2:
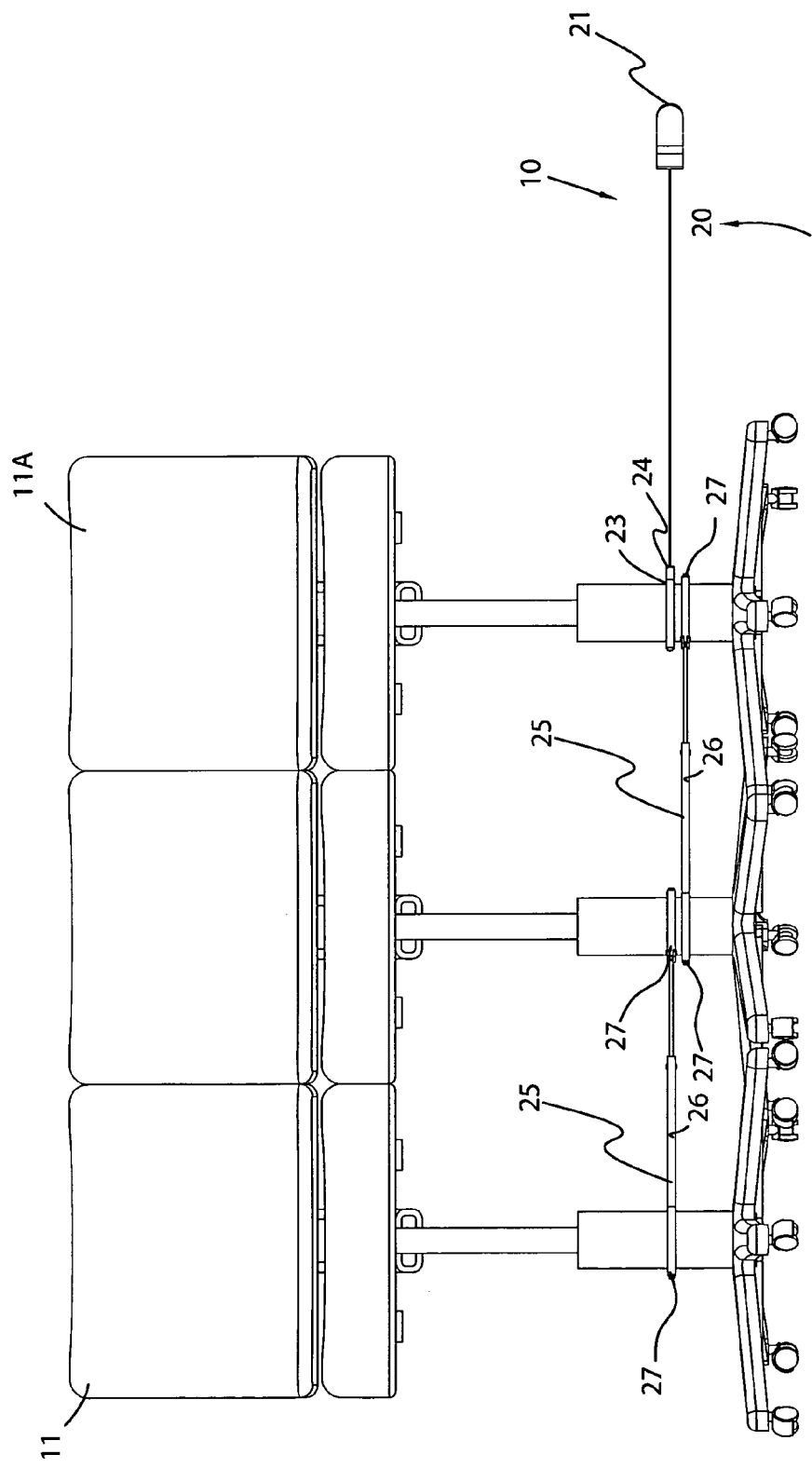
FIG. 2 is a front elevational view of the assembly shown in FIG. 1.

Referring initially to FIGS. 1 and 2, a manually-operable coupling assembly 10 for rolling a series of wheeled chairs 11 along a ground surface may include a primary coupling 20 preferably with a handle 21 section and an elongated strap 22 attached thereto. Such a primary coupling 20 further may include a primary clamp 23 attached to a distal end 24 of the strap 22. The coupling assembly 10 also may include a plurality of auxiliary couplings 25 each preferably including a strap 26 and a pair of axially opposed auxiliary clamps 27 mated with the strap 26 associated therewith respectively. The primary 23 clamps enable the user to removably attach and rotate the primary coupling 20 around a first chair 11A in a series of wheeled chairs 11. The user may thereby alter the travel path of the series of wheeled chairs 11 by rotating the primary coupling 20 and pulling in the desired direction.

The primary 20 and auxiliary couplings 25 are preferably adapted to be engaged to the series of wheeled chairs 11 and thereafter configured in such a manner that the primary 20 and auxiliary 25 couplings lay at an end-to-end pattern during transport procedures. The combined elements of the primary coupling 20 and the auxiliary couplings 25 provide an unexpected benefit wherein the user may advantageously connect the first chair 11A in a series to the second chair 11 and the second chair to the third chair, etc. Thus, the user may transport the series of wheeled chairs 11 by hauling the primary coupling 20 attached to the first chair 11A, thereby saving time and energy.

Figure 3:
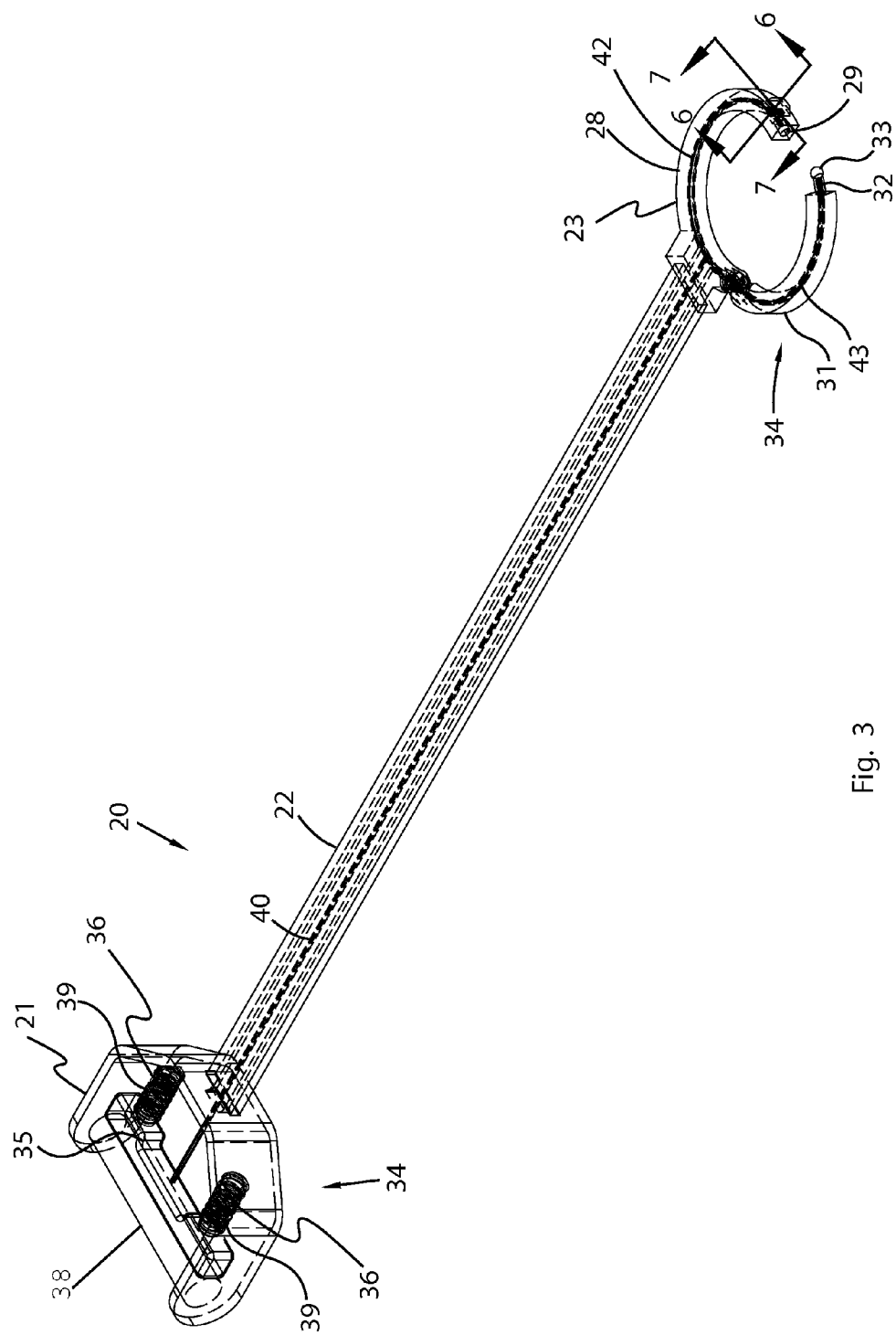
FIG. 3 is an enlarged perspective view of the primary coupling.
Figure 4:
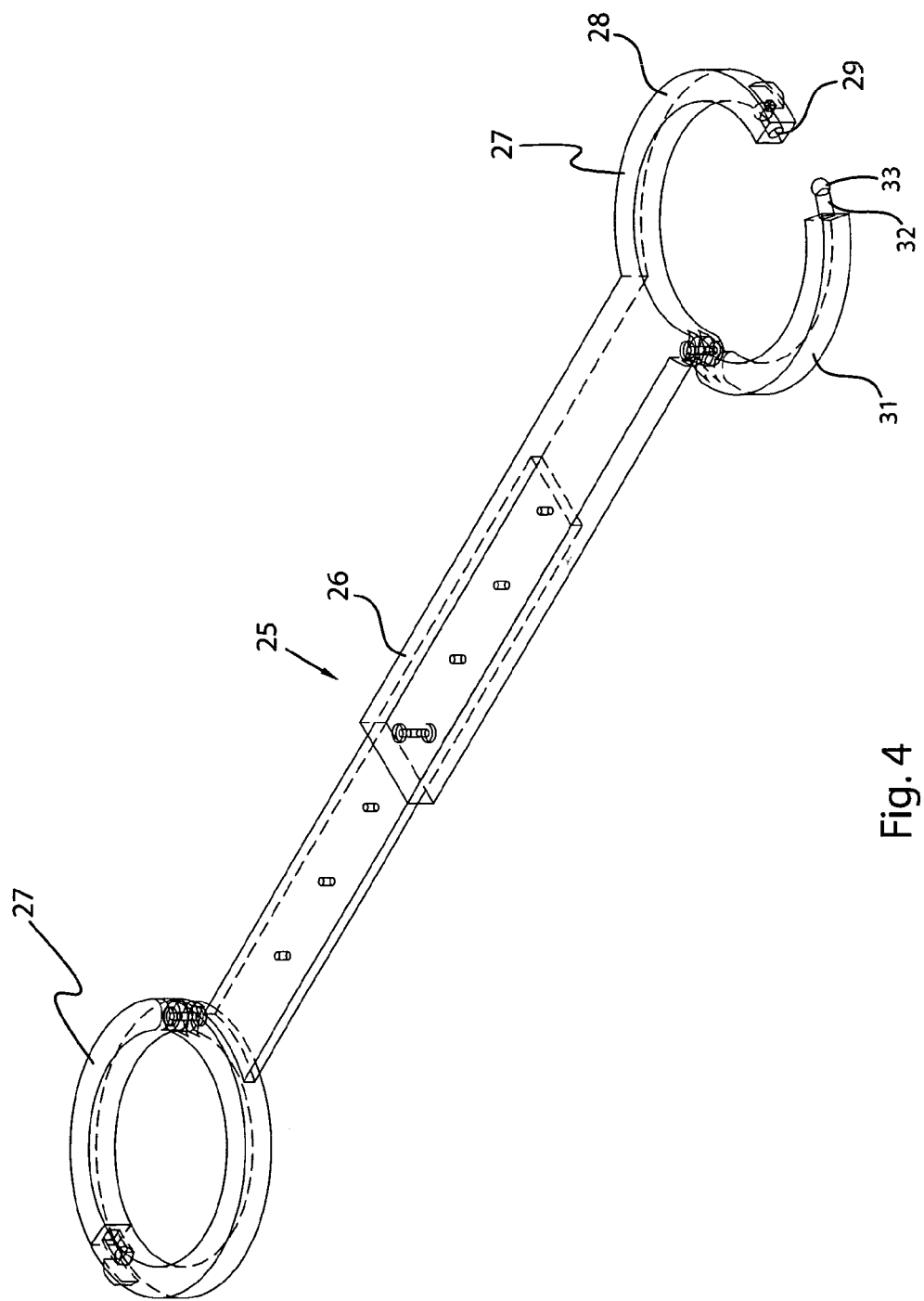
FIG. 4 is an enlarged perspective view of an auxiliary clamp.

Referring to FIGS. 3 and 4, each of the primary 23 and auxiliary clamps 27 may also include a first C-shaped region 28 rigidly mated to the strap 22, 26 and maintaining a fixed spatial relationship therewith. Such first C-shaped region 28 may include a cavity 29 formed therein and further may have a socket 30 slidably interfitted within the cavity 29. Additionally, a second C-shaped region 31 may be pivotally mated to the first C-shaped region 28 and preferably is selectively biased along an arcuate path defined adjacent to a corresponding one of the straps 22, 26. The first 28 and second 31 C-shaped regions are preferably configured to effectively clutch a cylinder of a typical wheeled chair 11, for example.

Referring to FIGS. 3, 4, 7 and 10, the second C-shaped region 31 may also have a male finger 32 protruding outwardly from a distal tip thereof. Such a male finger 32 preferably is provided with a ball bearing 33 disposed at a distal end thereof. Of course the male finger 32 and ball bearing 33 may be composed of resilient materials, which are advantageous for the first 28 and second 31 C-shaped regions to overcome the initial frictional force when the user initially pulls the primary 20 and auxiliary couplings from a stationary position during transport. The male finger 32 also may bend along a curvilinear path extending from a circumferential arc of the second C-shaped region 31.

Further, the ball bearing 33 may penetrate into the socket 30 and become interlocked therewith when the male finger 32 is introduced into the cavity 29. The first 28 and second 31 C-shaped regions may remain at the closed position when the ball bearing 33 is interlocked with the socket 30 and thereby bias the primary 23 and auxiliary clamps 27 to respective closed positions. The combined elements of the ball bearing 33 penetrating and interlocking with the socket 30 are vital for preventing the clamps 23, 27 from becoming prematurely disengaged. This feature allows the user to securely transport a series of wheeled chairs 11 over a rough ground surface.

Figure 5:
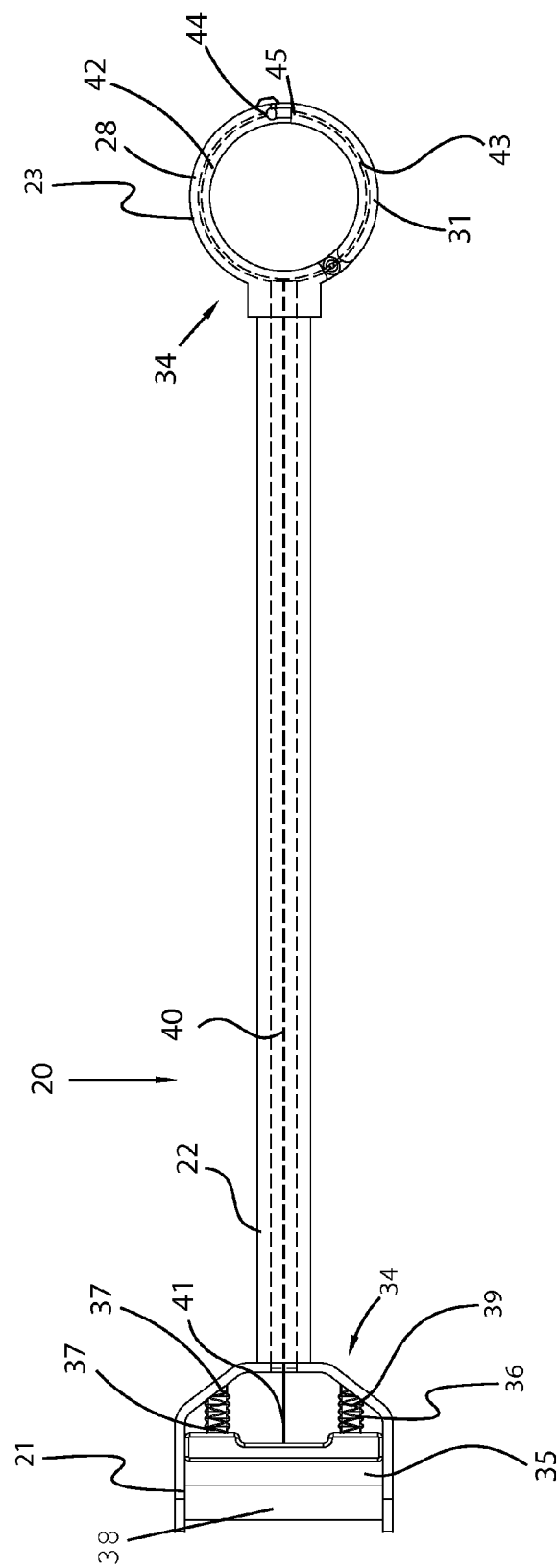
FIG. 5 is an enlarged top plan view of the primary clamp shown in FIG. 3.

Referring to FIGS. 3, 5 and 9, the primary coupling 20 may further include a mechanism 34 for automatically pivoting the primary clamp 23 between the closed position and an open position by reciprocating a portion of the handle 21 section along a linear path defined parallel to a longitudinal length of the strap 22 of the primary coupling 20.

The automatic primary clamp pivoting mechanism 34 may further include a lever 35 attached to the handle 21 section of the primary clamp 23 and a plurality of collapsible sleeves 36 preferably with axially opposed ends 37 anchored to the lever 35 and a distal end 38 of the handle section 21 respectively. Additionally, the automatic primary clamp pivoting mechanism 34 may include a plurality of resilient spring members 39 housed within the sleeves 36. The collapsible sleeves 36 are important for protecting the user's hand from injury by the resilient spring members 39 during normal operation of the lever 35. Such spring members 39 preferably are anchored to the lever 35 at the distal end 38 of the handle section 21 which is helpful so that the spring members 39 compress and expand along mutually exclusive linear paths defined within the sleeves 36 respectively. The spring members 39 urge lever 35 distally so that the lever 35 remains positioned at the distal end 38 of the handle section 21 when disengaged.

Referring to FIGS. 3, 5, 7 and 10, the automatic primary clamp pivoting mechanism 34 may include a tensioned cable 40 preferably with a proximal end 41 statically connected directly without the use of intervening elements to the lever 35. Such a tensioned cable 40 is preferably distally directed along the longitudinal length of the strap 22 and thereafter splits into first 42 and second 43 arcuate cable regions diverging along mutually exclusive arcuate paths.

Such paths are defined within the first 28 and second 31 C-shaped regions of the primary clamp 23 respectively. The first 42 and second 43 arcuate cable regions preferably have a corresponding distal end 44, 45 anchored to the socket 30 and the male finger 32 respectively. Each of the first 42 and second 43 arcuate cable portions preferably are simultaneously retracted and extended along the mutually exclusive arcuate paths when the lever 35 is linearly displaced towards and away from the proximal end of the strap 22 respectively.

In this manner, the tensioned cable 40 and the first 42 and second 43 arcuate cable regions relax/extend when the user disengages the lever 35. This allows the first 28 and second 31 C-shaped regions to engage, thereby closing the primary clamp 23. The automatic primary clamp pivoting mechanism 34 ensures that the primary clamp 23 remains closed unless the user activates the lever 35 on the handle section 21. This beneficial feature prevents the primary clamp 23 from disengaging if the user loses grip on the handle section 21 while transporting wheeled chairs.

In particular, referring to FIGS. 6, 7 and 10, ball bearing 33 is not prematurely disengaged from the socket 30 when an initial pulling force is exerted on the primary handle 20 from a resting position. This is achieved by permitting the socket 30 and ball bearing 33 to move in sync inside the first C-shaped region 28 when the initial pulling force is exerted against the first and second C-shaped regions 28, 31, respectively. As the initial pulling force is exerted, the spring-actuated stop block 46 prohibits the ball bearing 33 from suddenly jerking away from the socket 30 because the stop block 46 maintains a continuous frictional engagement with the ball bearing 33 and socket 30 and permits an elastic movement along a predetermined path (as perhaps best seen in FIG. 10).

In this manner, the spring-actuated stop block 46 is calibrated to withstand varying pulling forces during transport as needed. For example, a high tension calibration may be employed to withstand high pulling forces when moving heavy chairs over rough terrain. This can be identified as a maximum threshold force, for example.

The maximum threshold force of the spring-actuated stop block 46 may be overcome by squeezing lever 35 and thereby forcefully retracting the first and second arcuate cable regions 42, 43 away from each other. This retracting motion overcomes the maximum threshold force required to bias the spring-actuated stop block 46 to an extreme position and thereby permits the ball bearing 33 to disengage the socket 30 so that the second C-shaped region 31 is caused to articulate away from the first C-shaped region 28. Of course, a user may manually toggle the stop block 46 to the extreme position so that the ball bearing 33 is disengaged from the socket 30.

The stop block 46 is preferably situated along a travel path of the ball bearing 33 and socket 30 for maintaining continuous abutment thereagainst when the first and second C-shaped regions 28, 31 are locked together. Advantageously, the ball bearing 33 and socket 30 are permitted to be slidably displaced in sync within said first C-shaped region 28. Such a synchronous displacement provides a tolerance range during which the initial pulling force is absorbed by the calibration of the stop block 46 so that even if the initial pulling force slightly exceeds the maximum threshold force, the ball bearing 33 and socket 30 are maintained at an interlocked relationship during the initial acceleration from a resting position. Of course, the ball bearing 33 and socket 30 may be resiliently displaced towards and away from the stop block 46 when the first and second arcuate cable portions 42, 43 are retracted and extended respectively, or when the initial pulling force is increased and decreased respectively.

Referring to FIGS. 4 and 8, the hand-operable coupling assembly 10 may further include auxiliary clamps 27 remaining at corresponding closed positions while the primary clamp 23 may be automatically biased between the open and closed positions respectively. In this manner, the user may transport wheeled chairs 11 with differently sized bases. This is possible because one of the telescoping auxiliary couplings 25 may attach to the first wheeled chair 11A and extend beyond a large radius of the base to attach to the second wheeled chair 11. Further, the straps 26 of the auxiliary clamps 27 may be telescopically adjusted respective longitudinal lengths thereof.

In use, a method for rolling a series of wheeled chairs along a ground surface may include the first step of providing a primary coupling 20 including a handle 21 section and an elongated strap 22 attached thereto. The primary coupling 20 further may include a primary clamp 23 attached to a distal end 24 of the strap 22. A second step of the method preferably includes providing a plurality of auxiliary couplings 25 each including a strap 26 and a pair of axially opposed auxiliary clamps 27 mated with the strap 26 associated therewith respectively. Thirdly, the method may include the step of engaging the auxiliary couplings 25 to the series of wheeled chairs 11.

The method may further include a fourth step of engaging the primary coupling 20 to the series of wheeled chairs 11 by automatically pivoting the primary clamp 23 between open and closed positions by reciprocating a portion of the handle 21 section along a linear path defined parallel to a longitudinal length of the strap 22 of the primary coupling 20. Fifth, the method may include configuring the primary 20 and auxiliary 25 couplings in such a manner that the primary 20 and auxiliary 25 couplings lay at an end-to-end pattern during transport. Sixth, the method preferably includes transporting the series of wheeled chairs 11 between remote locations. Finally, the method may entail disengaging the primary 20 and auxiliary 25 couplings from the series of wheeled chairs 11 respectively.

While the invention has been described with respect to a certain specific embodiment, it will be appreciated that many modifications and changes may be made by those skilled in the art without departing from the spirit of the invention. It is intended, therefore, by the appended claims to cover all such modifications and changes as fall within the true spirit and scope of the invention.

In particular, with respect to the above description, it is to be realized that the optimum dimensional relationships for the parts of the present invention may include variations in size, materials, shape, form, function and manner of operation. The assembly and use of the present invention are deemed readily apparent and obvious to one skilled in the art.

What is claimed as new and what is desired to secure by Letters Patent of the United States is:

1. A hand-operable coupling assembly for rolling a series of wheeled chairs along a ground surface, said hand-operable coupling assembly comprising:

a primary coupling including a handle section and an elongated strap attached thereto, said primary coupling further including a primary clamp attached to a distal end of said strap; and a plurality of auxiliary couplings each including a strap and a pair of axially opposed auxiliary clamps mated with said strap associated therewith respectively;

wherein said primary and auxiliary couplings are adapted to be engaged to the series of wheeled chairs during transport procedures;

wherein each of said primary and auxiliary clamps comprises a first C-shaped region rigidly mated to said strap and maintaining a fixed spatial relationship therewith, said first C-shaped region including a cavity formed therein and further having a socket slidably interfitted within said cavity; and a second C-shaped region pivotally mated to said first C-shaped region and being selectively biased along an arcuate path defined adjacent to a corresponding one of said straps, said second C-shaped region having a male finger protruding outwardly from a distal tip thereof, said male finger being provided with a ball bearing disposed at a distal end thereof, said male finger bending along a curvilinear path extending from a circumferential arc of said second C-shaped region;

wherein said ball bearing penetrates into said socket and becomes interlocked therewith when said male finger is introduced into said cavity, said first and second C-shaped regions remaining at a closed position when said ball bearing is interlocked with said socket and thereby bias said primary and auxiliary clamps to respective closed positions.

2. The hand-operable coupling assembly of claim 1, wherein said primary coupling comprises: means for automatically pivoting said primary clamp between a closed position and an open position by reciprocating a portion of said handle section along a linear path defined parallel to a longitudinal length of said strap of said primary coupling.

3. The hand-operable coupling assembly of claim 2, wherein said automatic primary clamp pivoting means comprises:

a lever attached to said handle section of said primary clamp;

a plurality of collapsible sleeves having axially opposed ends anchored to said lever and a distal end of said handle section respectively;

a plurality of resilient spring members housed within said sleeves, said spring members being anchored to said lever and said distal end of said handle section such that said spring members compress and expand along mutually exclusive linear paths defined within said sleeves respectively; and a tensioned cable having a proximal end statically connected directly to said lever, said tensioned cable being distally directed along the longitudinal length of said strap and thereafter splitting into first and second arcuate cable regions diverging along mutually exclusive arcuate paths defined within said first and second C-shaped regions of said primary clamp respectively;

wherein said first and second arcuate cable regions have a corresponding distal end anchored to said male finger and said socket respectively, each of said first and second arcuate cable portions being simultaneously retracted and extended along said mutually exclusive arcuate paths when said lever is linearly displaced towards and away from said proximal end of said strap respectively.

4. The hand-operable coupling assembly of claim 3, wherein said ball bearing is disengaged from said socket and thereby permits said second C-shaped region to articulate away from said first C-shaped region when said lever is squeezed towards said proximal end of said strap.

5. The hand-operable coupling assembly of claim 3, wherein said automatic primary clamp pivoting means further comprises:

a spring-actuated stop block resiliently connected to an outer surface of said first C-shaped region of said primary clamp, said socket being displaced towards and away from said stop block when said first arcuate cable portion is extracted and retracted respectively, said stop block permitting said ball bearing and said socket to synchronously slide inside said first C-shaped region when an initial requisite pulling force is exerted against said primary clamp during transport, said stop block thereby prohibiting said ball bearing and said socket from prematurely separating until a maximum threshold force is exerted on said primary clamp;

wherein said maximum threshold force is greater than the initial requisite pulling force to move the series of wheeled chairs from a static position.

6. The hand-operable coupling assembly of claim 3, wherein said auxiliary clamps remain at corresponding closed positions while said primary clamp is automatically biased between said open and closed positions respectively.

7. The hand-operable coupling assembly of claim 1, wherein said straps of said auxiliary clamps have telescopically adjusted longitudinal lengths respectively.

8. A hand-operable coupling assembly for rolling a series of wheeled chairs along a ground surface, said hand-operable coupling assembly comprising:

a primary coupling including a handle section and an elongated strap attached thereto, said primary coupling further including a primary clamp attached to a distal end of said strap; and a plurality of auxiliary couplings each including a strap and a pair of axially opposed auxiliary clamps mated with said strap associated therewith respectively;

wherein said primary and auxiliary couplings are adapted to be engaged to the series of wheeled chairs and thereafter configured in such a manner that said primary and auxiliary couplings lay at an end-to-end pattern during transport procedures;

wherein each of said primary and auxiliary clamps comprises:

a first C-shaped region rigidly mated to said strap and maintaining a fixed spatial relationship therewith, said first C-shaped region including a cavity formed therein and further having a socket slidably interfitted within said cavity; and a second C-shaped region pivotally mated to said first C-shaped region and being selectively biased along an arcuate path defined adjacent to a corresponding one of said straps, said second C-shaped region having a male finger protruding outwardly from a distal tip thereof, said male finger being provided with a ball bearing disposed at a distal end thereof, said male finger bending along a curvilinear path extending from a circumferential arc of said second C-shaped region;

wherein said ball bearing penetrates into said socket and becomes interlocked therewith when said male finger is introduced into said cavity, said first and second C-shaped regions remaining at a closed position when said ball bearing is interlocked with said socket and thereby bias said primary and auxiliary clamps to respective closed positions.

9. The hand-operable coupling assembly of claim 8, wherein said primary coupling comprises: means for automatically pivoting said primary clamp between a closed position and an open position by reciprocating a portion of said handle section along a linear path defined parallel to a longitudinal length of said strap of said primary coupling.

10. The hand-operable coupling assembly of claim 9, wherein said automatic primary clamp pivoting means comprises:

a lever attached to said handle section of said primary clamp;

a plurality of collapsible sleeves having axially opposed ends anchored to said lever and a distal end of said handle section respectively;

a plurality of resilient spring members housed within said sleeves, said spring members being anchored to said lever and said distal end of said handle section respectively such that said spring members compress and expand along mutually exclusive linear paths defined within said sleeves respectively; and a tensioned cable having a proximal end statically connected directly to said lever, said tensioned cable being distally directed along the longitudinal length of said strap and thereafter splitting into first and second arcuate cable regions diverging along mutually exclusive arcuate paths defined within said first and second C-shaped regions of said primary clamp respectively;

wherein said first and second arcuate cable regions have a corresponding distal end anchored to said male finger and said socket respectively, each of said first and second arcuate cable portions being simultaneously retracted and extended along said mutually exclusive arcuate paths when said lever is linearly displaced towards and away from said proximal end of said strap respectively.

11. The hand-operable coupling assembly of claim 10, wherein said ball bearing is disengaged from said socket and thereby permits said second C-shaped region to articulate away from said first C-shaped region when said lever is squeezed towards said proximal end of said strap.

12. The hand-operable coupling assembly of claim 10, wherein said automatic primary clamp pivoting means further comprises:

a spring-actuated stop block resiliently connected to an outer surface of said first C-shaped region of said primary clamp, said socket being displaced towards and away from said stop block when said first arcuate cable portion is extracted and retracted respectively, said stop block permitting said ball bearing and said socket to synchronously slide inside said first C-shaped region when an initial requisite pulling force is exerted against said primary clamp during transport, said stop block thereby prohibiting said ball bearing and said socket from prematurely separating until a maximum threshold force is exerted on said primary clamp;

wherein said maximum threshold force is greater than the initial requisite pulling force to move the series of wheeled chairs from a static position.

13. The hand-operable coupling assembly of claim 10, wherein said auxiliary clamps remain at corresponding closed positions while said primary clamp is automatically biased between said open and closed positions respectively.

14. The hand-operable coupling assembly of claim 8, wherein said straps of said auxiliary clamps have telescopically adjusted longitudinal lengths respectively.

15. A method for rolling a series of wheeled chairs along a ground surface, said method comprising the chronological steps of:

a. providing a primary coupling including a handle section and an elongated strap attached thereto, said primary coupling further including a primary clamp attached to a distal end of said strap;

b. providing a plurality of auxiliary couplings each including a strap and a pair of axially opposed auxiliary clamps mated with said strap associated therewith respectively;

c. engaging said auxiliary couplings to the series of wheeled chairs;

d. engaging said primary coupling to the series of wheeled chairs by automatically pivoting said primary clamp between open and closed positions by reciprocating a portion of said handle section along a linear path defined parallel to a longitudinal length of said strap of said primary coupling;

e. configuring said primary and auxiliary couplings in such a manner that said primary and auxiliary couplings lay at an end-to-end pattern during transport;

f. transporting the series of wheeled chairs between remote locations; and g. disengaging said primary and auxiliary couplings from the series of wheeled chairs respectively.

* * * * *